United States Patent
Kim et al.

(10) Patent No.: US 10,016,688 B1
(45) Date of Patent: *Jul. 10, 2018

(54) SECONDARY-GAME-MODE SESSIONS BASED ON PRIMARY-GAME-MODE ARRANGEMENTS OF USER-CONTROLLED ELEMENTS

(71) Applicant: Electronic Arts Inc., Redwood City, CA (US)

(72) Inventors: John Kim, San Francisco, CA (US); Bryan Tsao, San Carlos, CA (US); Inyang Akpan, San Francisco, CA (US); Kevin Chanthasiriphan, San Francisco, CA (US); Albert Wei, San Francisco, CA (US); David McNeill, San Francisco, CA (US)

(73) Assignee: ELECTRONIC ARTS INC., Redwood City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/423,897

(22) Filed: Feb. 3, 2017

Related U.S. Application Data

(63) Continuation of application No. 13/942,505, filed on Jul. 15, 2013, now Pat. No. 9,586,133.

(51) Int. Cl.
*A63F 9/24* (2006.01)
*A63F 13/00* (2014.01)
(Continued)

(52) U.S. Cl.
CPC ............ *A63F 13/85* (2014.09); *A63F 13/335* (2014.09); *A63F 13/352* (2014.09); *A63F 13/63* (2014.09);
(Continued)

(58) Field of Classification Search
None
See application file for complete search history.

(56) References Cited

U.S. PATENT DOCUMENTS

| 8,328,644 | B2 | 12/2012 | Busey |
| 2002/0034980 | A1 | 3/2002 | Lemmons |
| 2011/0275442 | A1 | 11/2011 | Hawkins |

OTHER PUBLICATIONS

"Street Fighter IV 4 PC version Training Mode Ryu," Jan Doedel, Jul. 4, 2009, https://www.youtube.com/watch?v=sPJtclkv74c (2 pgs).

(Continued)

*Primary Examiner* — Kevin Y Kim
(74) *Attorney, Agent, or Firm* — Knobbe, Martens, Olson & Bear, LLP

(57) ABSTRACT

Approaches for secondary-game-mode sessions based on primary-game-mode arrangements of user-controlled elements are provided. Actions by user-controlled elements of a first user or other game-space elements in a primary game mode of a game space may be managed. A session request for a session in a secondary game mode of the game space may be received from the first user. A first session for the first user may be executed in the secondary game mode such that: (i) the first session involves artificial-intelligence-controlled elements as opponents against the user-controlled elements; (ii) an arrangement of the user-controlled elements at a beginning of the first session is the same as an arrangement of the user-controlled elements in the primary game mode at a time of the session request; and (iii) impacts on the user-controlled elements during the first session in the secondary game mode are not reflected in the primary game mode.

18 Claims, 5 Drawing Sheets

(51) Int. Cl.
    *G06F 17/00*     (2006.01)
    *G06F 19/00*     (2018.01)
    *A63F 13/85*     (2014.01)
    *A63F 13/69*     (2014.01)
    *A63F 13/63*     (2014.01)
    *A63F 13/798*     (2014.01)
    *A63F 13/87*     (2014.01)
    *A63F 13/837*     (2014.01)
    *A63F 13/335*     (2014.01)
    *A63F 13/352*     (2014.01)
    *A63F 13/92*     (2014.01)
    *A63F 13/95*     (2014.01)
    *G06N 5/02*     (2006.01)

(52) U.S. Cl.
CPC ............ *A63F 13/69* (2014.09); *A63F 13/798* (2014.09); *A63F 13/837* (2014.09); *A63F 13/87* (2014.09); *A63F 13/92* (2014.09); *A63F 13/95* (2014.09); *G06N 5/02* (2013.01); *A63F 2300/204* (2013.01); *A63F 2300/207* (2013.01); *A63F 2300/208* (2013.01); *A63F 2300/407* (2013.01); *A63F 2300/57* (2013.01); *A63F 2300/572* (2013.01); *A63F 2300/6036* (2013.01); *A63F 2300/65* (2013.01); *A63F 2300/8076* (2013.01)

(56) References Cited

OTHER PUBLICATIONS

Rareware, "Killer Instinct," Aug. 30, 1995, Midway, instruction manual and article http://en.wikipedia.org/wiki/Killer_Instinct_%281994_video_game%29, 15 pages.
Street Fighter 4, Jul. 7, 2009, Capcom, instruction manual, 30 pages.
Street Fighter Wiki, "Stage", http://web.archive.org/web/20130628104745/http://streetfighter.wikia.com/wiki/Stage, page snapshotted on Jun. 28, 2013 and referencing materials dated Sep. 10, 1993, 3 pages.

SECONDARY-GAME-MODE SESSIONS BASED ON PRIMARY-GAME-MODE ARRANGEMENTS OF USER-CONTROLLED ELEMENTS

FIELD OF THE DISCLOSURE

This disclosure relates generally to secondary-game-mode sessions, such as secondary-game-mode sessions based on primary-game-mode arrangements of user-controlled elements or other secondary-game-mode sessions.

BACKGROUND

In a game space (or other virtual space), users may create and develop their elements (e.g., structures, character units, items, or other elements). The elements may be controlled by the users to interact with the virtual space and/or each other. For example, users may utilize their user-controlled elements to attack other user-controlled elements or defend against other user-controlled elements, resulting in damage or other impacts to their user-controlled elements. However, users are typically unable to test out the user-controlled elements that they have created and developed, or their strategies and skills using their user-controlled elements, for instance, without incurring damage or other impacts to their user-controlled elements. These and other drawbacks exist.

SUMMARY

One aspect of the disclosure relates to a system configured to facilitate secondary-game-mode sessions based on primary-game-mode arrangements of user-controlled elements, in accordance with one or more implementations. In exemplary implementations, regular game play may be provided to users in a primary game mode of a game space where the users may create and develop their user-controlled elements to defend their bases, attack other bases of other users, or perform other actions. Training, practice, or other sessions may be executed in a secondary game mode of the game space for users where an arrangement of the user-controlled elements of a user at a beginning of a session in the secondary game mode is the same as an arrangement of the user-controlled elements in the primary game mode at a time of a session request for the secondary-game-mode session by the user. In certain implementations, impacts on the user-controlled elements during the secondary-game-mode session may not be reflected for the user-controlled elements in the primary game mode. For example, damage to the user-controlled elements that is caused by artificial-intelligence-controlled elements or other opponents during the secondary-game session may not negatively affect the user-controlled elements in the primary game mode. In this way, among other benefits, users may test out the user-controlled elements that they have created and developed, or their strategies and skills using their user-controlled elements without incurring damage or other impacts to their user-controlled elements.

In some implementations, the system may include one or more servers. The server(s) may be configured to communicate with one or more client computing platforms according to a client/server architecture. The users may access the system and/or a virtual space (e.g., a virtual world, a game space, etc.) via the client computing platforms.

The server(s) may be configured to execute one or more computer program modules to facilitate secondary-game-mode sessions based on primary-game-mode arrangements of user-controlled elements. The computer program modules may include one or more of a game module, a user element module, an artificial-intelligence element module, a primary mode module, a secondary mode module, and/or other modules. In some implementations, the client computing platforms may be configured to execute one or more computer program modules that are the same as or similar to the computer program modules of the server(s) to facilitate secondary-game-mode sessions based on primary-game-mode arrangements of user-controlled elements.

The game module may be configured to execute an instance of a game space. The game module may be configured to facilitate presentation of views of the game space to users. The game space may be configured to facilitate interaction of the users with the game space and/or each other by performing operations in the game space in response to commands received from the users.

The user element module may be configured to manage a plurality of user-controlled elements existing in the game space that are controlled by, positioned by, or associated with the users. By way of example, the users may include a first user, a second user, or other users. The plurality of user-controlled elements may include one or more first user-controlled elements existing in the game space that are controlled by, positioned by, or associated with the first user, one or more second user-controlled elements existing in the game space that are controlled by, positioned by, or associated with the second user, or other user-controlled elements existing in the game space that are controlled by, positioned by, or associated with the other users.

In certain implementations, the plurality of user-controlled elements may include structures, character units, items, or other elements controlled by, positioned by, or associated with the users. The one or more first user-controlled elements may include one or more of first structures, first character units, first items, or other elements controlled by, positioned by, or associated with the first user. The one or more second user-controlled elements may include one or more of second structures, second character units, second items, or other elements controlled by, positioned by, or associated with the second user.

In some implementations, the game space may include a plurality of areas. The plurality of areas may include a first area associated with the first user, a second area associated with the second user, or other areas. In one or more implementations, the user element module may be configured such that the first structures, the first character units, or the first items come into existence with respect to the game space in the first area. For example, the game that takes place may include a realm-building mechanic, wherein a realm of the first user is associated with the first area.

The artificial-intelligence element module may be configured to manage a plurality of artificial-intelligence-controlled elements (e.g., structures, character units, items, or other elements controlled by artificial intelligence). For example, the plurality of artificial-intelligence-controlled elements may include one or more first artificial-intelligence-controlled elements associated with one or more first secondary-game-mode parameters, one or more second artificial-intelligence-controlled elements associated with one or more second secondary-game-mode parameters, or other artificial-intelligence-controlled elements. Secondary-game-mode parameters may, for instance, relate to: one or more difficulty levels; one or more types of elements; one or more formations of the elements that relate to attack, defense, or other actions of the elements; or other characteristics relating to a secondary-game-mode session or the elements in a secondary-game-mode session. Artificial-intelligence-controlled elements may include one or more elements that are separate instances or the same element types as elements that are controlled by users within the game space The primary mode module may be configured to manage a plurality of actions by the one or more first user-controlled elements, one or more other user-controlled elements, or one or more other artificial-intelligence-controlled elements in a primary game mode of the game space. By way of example, the plurality of actions may include attacks by the one or more first user-controlled elements on the one or more other user-controlled elements or attacks by the one or more other user-controlled elements on the one or more first user-controlled elements. As another example, the plurality of actions may include attacks by the one or more first user-controlled elements on the other artificial-intelligence-controlled elements or attacks by the one or more other artificial-intelligence-controlled elements on the one or more first user-controlled elements.

The secondary mode module may be configured to receive a session request from the first user for a session in a secondary game mode of the game space. In certain implementations, the session request may include information identifying one or more secondary-game-mode parameters for a session in the secondary game mode. In some implementations, secondary mode module 114 may be configured to select the one or more first artificial-intelligence-controlled elements (associated with the first secondary-game-mode parameters) as opponents against the one or more first user-controlled elements for the first session. The selection may, for instance, be based on a determination that the one or more secondary-game-mode parameters correspond to the one or more first secondary-game-mode parameters.

The secondary mode module may be configured to execute a first session for the first user in the secondary game mode such that: (i) the first session involves the one or more first artificial-intelligence-controlled elements as opponents against the one or more first user-controlled elements; (ii) an arrangement of the one or more first user-controlled elements at a beginning of the first session is the same as an arrangement of the one or more first user-controlled elements in the primary game mode at a time of the session request; or (iii) one or more impacts on the one or more first user-controlled elements during the first session in the secondary game mode are not reflected for the one or more first user-controlled elements in the primary game mode.

In various implementations, the one or more impacts may include a modification to one or more hit point statuses of the one or more first user-controlled elements. The modification to the one or more hit point statuses may, for instance, relates to one or more actions of the one or more first user-controlled elements or the one or more first artificial-intelligence-controlled elements during the first session. In some implementations, the modification may include an increase to at least one of the one or more hit point statuses of at least one of the one or more first user-controlled elements, or a decrease to at least another one of the one or more hit point statuses of at least another one of the one or more first user-controlled elements.

In certain implementations, the secondary mode module may be configured such that the modification is reflected for the one or more first user-controlled elements in the secondary game mode while not reflected for the one or more first user-controlled elements in the primary game mode.

As indicated, in various implementations, the plurality of user-controlled elements may include structures, character units, items, or other elements controlled by, positioned by, or associated with the users. The one or more first user-controlled elements may include one or more of first structures, first character units, first items, or other elements controlled by, positioned by, or associated with the first user. In one or more implementations, the primary mode module or the secondary mode module may be configured such that one or more of the first structures, the first character units, or the first items defend the first area in the primary game mode and during the first session in the second game mode.

As indicated, in some implementations, the plurality of artificial-intelligence-controlled elements may include the one or more first artificial-intelligence-controlled elements associated with one or more first secondary-game-mode parameters, the one or more second artificial-intelligence-controlled elements associated with one or more second secondary-game-mode parameters, or other artificial-intelligence-controlled elements. In one or more implementations, the secondary mode module may be configured such that the one or more first secondary-game-mode parameters include a parameter relating to first difficulty level, and the one or more second secondary-game-mode parameters include a parameter relating to a second difficulty level that is different than the first difficult level.

In certain implementations, the secondary mode module may be configured to manage instruction sets relating to actions to be performed by one or more of the plurality of artificial-intelligence-controlled elements during a session in the secondary game mode. The instruction sets may include a first instruction set that is associated with the one or more first secondary-game-mode parameters and that relates to first actions to be performed by one or more of the plurality of artificial-intelligence-controlled elements during a session in the secondary game mode.

In some implementations, the execution of the first session by the secondary mode module may comprise execution of the first instruction set to cause the one or more first artificial-intelligence-controlled elements to perform the first actions during the first session. The secondary mode module may, for instance, execute the first instruction set to cause the one or more first artificial-intelligence-controlled elements to perform the first actions during the first session based on the determination that the one or more secondary-game-mode parameters (identified by information in the session request) correspond to the one or more first secondary-game-mode parameters (to which the first instruction set is associated).

In one or more implementations, the secondary mode module may be configured such that the first actions performed by the one or more first artificial-intelligence-controlled elements during the first session include one or more of: (i) attacking the one or more first user-controlled elements in accordance with one or more first formations of the one or more first artificial-intelligence-controlled elements; or (ii) defending against the one or more first user-controlled elements in accordance with one or more second formations of the one or more first artificial-intelligence-controlled elements.

In various implementations, the secondary mode module may be configured to receive another session request from the first user for a session in the secondary game mode that is to occur after the first session. The other session request may include information identifying one or more other secondary-game-mode parameters for a session in the secondary game mode. The secondary mode module may be configured to select the one or more second artificial-intelligence-controlled elements as opponents against the one or more first user-controlled elements for a second session for the first user in the secondary game mode. The selection may, for instance, be based on a determination that the one or more other secondary-game-mode parameters (identified by information in the other session request) correspond to the one or more second secondary-game-mode parameters (to which the one or more second artificial-intelligence-controlled elements are associated).

In some implementations, the secondary mode module may be configured to execute the second session such that: (i) the second session involves the one or more second artificial-intelligence-controlled elements as opponents against the one or more first user-controlled elements; (ii) an arrangement of the one or more first user-controlled elements at a beginning of the second session is an arrangement of the one or more first user-controlled elements at a time of the other session request; or (iii) one or more other impacts on the one or more first user-controlled elements during the second session in the secondary game mode are not reflected for the one or more first user-controlled elements in the primary game mode.

In certain implementations, the secondary mode module may be configured such that the instruction sets include a second instruction set that is associated with the one or more second secondary-game-mode parameters and that relates to second actions to be performed by one or more of the plurality of artificial-intelligence-controlled elements during a session in the secondary game mode. In one or more implementations, the execution of the second session by the secondary mode module may comprise execution of the second set of instructions to cause the one or more second artificial-intelligence-controlled elements to perform the second actions during the second session. The secondary mode module may, for instance, execute the second set of instructions to cause the one or more second artificial-intelligence-controlled elements to perform the second actions during the second session based on the determination that the one or more other secondary-game-mode parameters correspond to the one or more second secondary-game-mode parameters.

In some implementations, the second actions performed by the one or more second artificial-intelligence-controlled elements during the second session may include one or more of: (i) attacking the one or more first user-controlled elements in accordance with one or more third formations of the one or more second artificial-intelligence-controlled elements; or (ii) defending against the one or more first user-controlled elements in accordance with one or more fourth formations of the one or more second artificial-intelligence-controlled elements. The one or more third formations may be different than the one or more first formations (with which the first actions are performed during the first session). The one or more fourth formations may be different than the one or more second formations (with which the first actions are performed during the first session).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
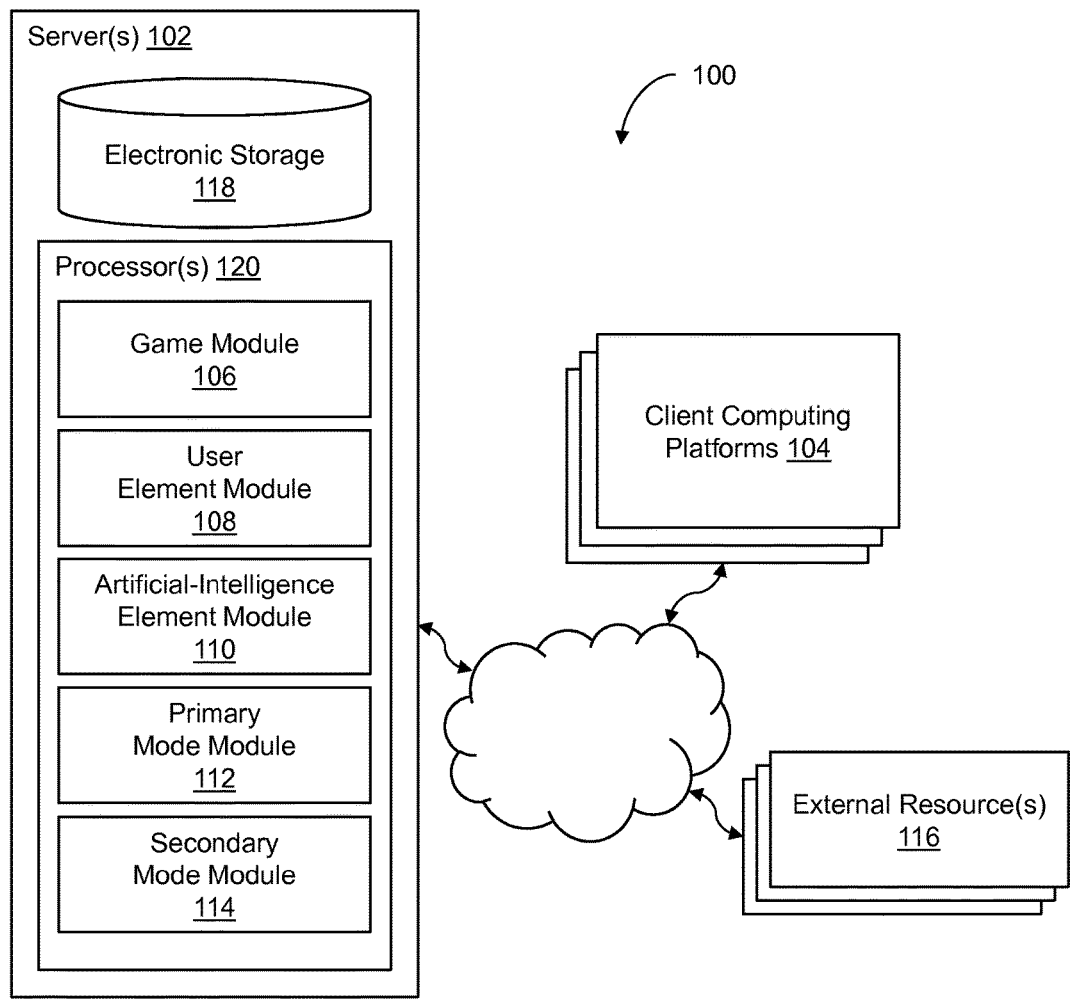
FIG. 1 illustrates a system configured to facilitate secondary-game-mode sessions based on primary-game-mode arrangements of user-controlled elements, in accordance with one or more implementations.

FIG. 1 illustrates a system 100 configured to facilitate secondary-game-mode sessions based on primary-game-mode arrangements of user-controlled elements, in accordance with one or more implementations. In exemplary implementations, regular game play may be provided to users in a primary game mode of a game space where the users may create and develop their user-controlled elements to defend their bases, attack other bases of other users, or perform other actions. Training, practice, or other sessions may be executed in a secondary game mode of the game space for users where an arrangement of the user-controlled elements of a user at a beginning of a session in the secondary game mode is the same as an arrangement of the user-controlled elements in the primary game mode at a time of a session request for the secondary-game-mode session by the user. As used herein, an arrangement of elements (e.g., user-controlled elements, artificial-intelligence-controlled elements, etc.) may refer to: one or more placements of the elements relative to one another, relative to an area, or at absolute locations with respect to the game space; one or more capabilities of the elements; one or more statuses of the elements; one or more predetermined actions to be taken by the elements; or other arrangement aspects relating to the elements.

In certain implementations, impacts on the user-controlled elements during the secondary-game-mode session may not be reflected for the user-controlled elements in the primary game mode. For example, damage to the user-controlled elements that is caused by artificial-intelligence-controlled elements or other opponents during the secondary-game session may not negatively affect the user-controlled elements in the primary game mode. In this way, among other benefits, users may test out the user-controlled elements that they have created and developed, or their strategies and skills using their user-controlled elements without incurring damage or other impacts to their user-controlled elements.

In some implementations, system 100 may include one or more servers 102. Server(s) 102 may be configured to communicate with one or more client computing platforms 104 according to a client/server architecture. The users may access system 100 and/or a virtual space (e.g., a virtual world, a game space, etc.) via client computing platforms 104.

Server(s) 102 may be configured to execute one or more computer program modules to facilitate secondary-game-mode sessions based on primary-game-mode arrangements of user-controlled elements. The computer program modules may include one or more of a game module 106, a user element module 108, an artificial-intelligence element module 110, a primary mode module 112, a secondary mode module 114, and/or other modules. In some implementations, client computing platforms 104 may be configured to execute one or more computer program modules that are the same as or similar to the computer program modules of server(s) 102 to facilitate secondary-game-mode sessions based on primary-game-mode arrangements of user-controlled elements.

Game module 106 may be configured to execute an instance of a game space. In some implementations, the game space may be a virtual space. As such, an instance of the game space may be an instance of the virtual space. A space module (not shown for illustrative convenience) may be configured to implement the instance of the virtual space executed by the computer modules to determine state of the virtual space. The state may then be communicated (e.g., via streaming visual data, via object/position data, and/or other state information) from server(s) 102 to client computing platforms 104 for presentation to users. The state determined and transmitted to a given client computing platform 104 may correspond to a view for a user character being controlled by a user via the given client computing platform 104. The state determined and transmitted to a given client computing platform 104 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which state of the virtual space is determined by the space module is not intended to be limiting. The space module may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by the space module, users may control characters, objects (e.g., structures, items, and/or other objects), simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user-controlled element(s) may move through and interact with the virtual space (e.g., non-user characters in the virtual space and/or other objects in the virtual space). The user-controlled elements controlled by, positioned by, and/or associated with a given user may be created and/or customized by the given user. The user may have an "inventory" of virtual goods and/or currency that the user can use (e.g., by manipulation of a user character and/or other user-controlled element) within the virtual space.

The users may participate in the instance of the virtual space by controlling one or more of the available user controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102 (e.g., through the space module).

User element module 108 may be configured to manage a plurality of user-controlled elements existing in the game space that are controlled by, positioned by, or associated with the users. By way of example, the users may include a first user, a second user, or other users. The plurality of user-controlled elements may include one or more first user-controlled elements existing in the game space that are controlled by, positioned by, or associated with the first user, one or more second user-controlled elements existing in the game space that are controlled by, positioned by, or associated with the second user, or other user-controlled elements existing in the game space that are controlled by, positioned by, or associated with the other users.

In certain implementations, the plurality of user-controlled elements may include structures, character units, items, or other elements controlled by, positioned by, or associated with the users. The one or more first user-controlled elements may include one or more of first structures, first character units, first items, or other elements controlled by, positioned by, or associated with the first user. The one or more second user-controlled elements may include one or more of second structures, second character units, second items, or other elements controlled by, positioned by, or associated with the second user. In one use case, structures under control of users may include defensive walls, barracks, watch towers, factories, bunkers, turrets, or other structures. The respective controlling users of the structures may develop the structures by adding weaponry or other capabilities to the structures, enhancing defense of the structures, or performing other upgrades. The structures, the upgrades relating to the structures, or other modifications to the arrangement of the structures may persist in the game space, for instance, so long as the structures are not deconstructed or destroyed by the controlling user, other user-controlled elements, artificial-intelligence controlled elements, etc.

In another use case, character units under control of users may include land-based combat units, water-based combat units, air-based combat units, medical units, mechanical repair units, construction units, resource collecting units, or other character units. The respective controlling users of the character units may develop the character units by equipping the character units with additional weaponry, training the character units to have new capabilities or to perform tasks more efficiently, or performing other upgrades. The character units, the upgrades relating to the character units, or other modifications to the arrangement of the character units may persist in the game space, for instance, so long as the character units are not dismissed, killed, or destroyed by the controlling user, other user-controlled elements, artificial-intelligence-controlled elements, etc.

In another use case, items under control of users may include vehicles for use by character units, weapons for equipping combat-related structures or character units, medical equipment for medical-related structures or character units, mechanical equipment for mechanic repair or construction units, or other items. The items, upgrades relating to the items, or other modifications to the arrangement of the items may persist in the game space, for instance, so long as the items are not discarded, given away, sold, or used up by the controlling user, the items are not destroyed, stolen, or taken by other elements in the game space, etc.

In some implementations, the game space may include a plurality of areas. The plurality of areas may include a first area associated with the first user, a second area associated with the second user, or other areas. In one or more implementations, user element module may be configured such that the first structures, the first character units, or the first items come into existence with respect to the game space in the first area. In one scenario, for instance, the first area may be an island, a base, or other area that is designated for the first user. Goals of the first user in the game space may include development of the first area, defending the first area from opponents (e.g., user-controlled elements controlled by other users, artificial-intelligence controlled elements, or other opponents), attacking other areas controlled by other users or by artificial intelligence, etc. To achieve these goals, the first user may bring an element into existence with respect to the game space by "warping in" the element to the first area in the game space, constructing the element in the first area, spawning the element in the first area, etc. For example, a warping structure in the first area may be used to "warp in" warriors to cause those warriors to actually exist in the game space. As another example, a factory may be constructed in the first area by character units under control of the first user. The factory may be used to construct vehicles to be used by other character units, drones, or other items.

Artificial-intelligence element module 110 may be configured to manage a plurality of artificial-intelligence-controlled elements (e.g., structures, character units, items, or other elements controlled by artificial intelligence). For example, the plurality of artificial-intelligence-controlled elements may include one or more first artificial-intelligence-controlled elements associated with one or more first secondary-game-mode parameters, one or more second artificial-intelligence-controlled elements associated with one or more second secondary-game-mode parameters, or other artificial-intelligence-controlled elements. Secondary-game-mode parameters may, for instance, relate to: one or more difficulty levels; one or more types of elements; one or more formations of the elements that relate to attack, defense, or other actions of the elements; or other characteristics relating to a secondary-game-mode session or the elements in a secondary-game-mode session. Further details with respect to secondary-game-mode parameters are provided herein.

Primary mode module 112 may be configured to manage a plurality of actions by the one or more first user-controlled elements, one or more other user-controlled elements, or one or more other artificial-intelligence-controlled elements in a primary game mode of the game space. By way of example, the plurality of actions may include attacks by the one or more first user-controlled elements on the one or more other user-controlled elements or attacks by the one or more other user-controlled elements on the one or more first user-controlled elements. As another example, the plurality of actions may include attacks by the one or more first user-controlled elements on the other artificial-intelligence-controlled elements or attacks by the one or more other artificial-intelligence-controlled elements on the one or more first user-controlled elements.

Secondary mode module 114 may be configured to receive a session request from the first user for a session in a secondary game mode of the game space. In certain implementations, the session request may include information identifying one or more secondary-game-mode parameters for a session in the secondary game mode. In some implementations, secondary mode module 14 may be configured to select the one or more first artificial-intelligence-controlled elements (associated with the first secondary-game-mode parameters) as opponents against the one or more first user-controlled elements for the first session. The selection may, for instance, be based on a determination that the one or more secondary-game-mode parameters correspond to the one or more first secondary-game-mode parameters.

Figure 2:
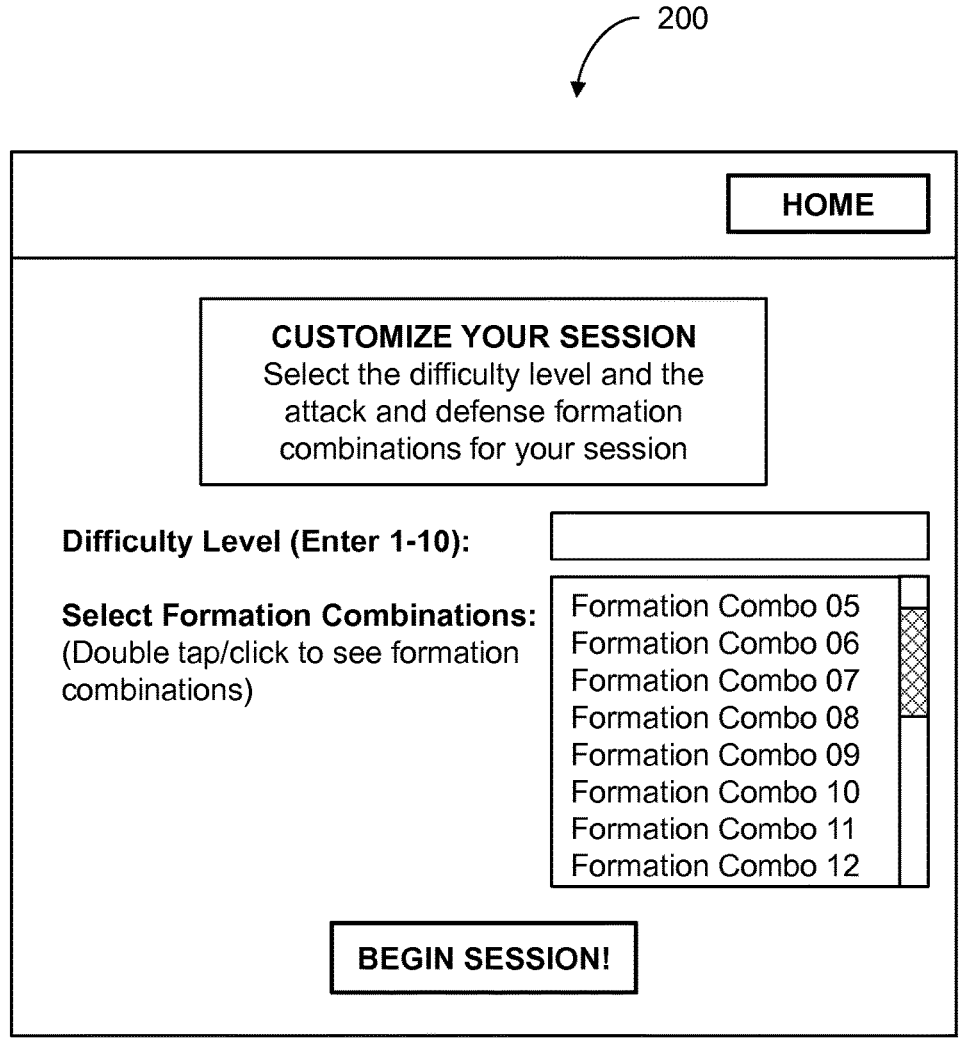
FIG. 2 illustrates a user interface for initiating a secondary-game-mode session, in accordance with one or more implementations.

For example, FIG. 2 illustrates a user interface 200 for initiating a secondary-game-mode session, in accordance with one or more implementations. As shown, user interface 200 may enable a user to customize and initiate a session in the secondary game space by selecting a difficulty level for the secondary-game-mode session and selecting a set of formations relating to attack, defense, or other actions to be performed by artificial-intelligence-controlled opponents during the secondary-game-mode session. A session request may be received by secondary mode module 114 when, for instance, the user activates the "BEGIN SESSION" button.

In one use case, the difficulty level selected by the user may determine the number of artificial-intelligence-controlled elements that are selected as opponents against user-controlled elements of the user, the capabilities of the artificial-intelligence-controlled elements, and the statuses of the artificial-intelligence-controlled elements.

In another use case, with respect to FIG. 2, the set of formations selected by a user may determine the varying formations that will be utilized by the artificial-intelligence-controlled elements during the secondary-game-mode session, the types of artificial-intelligence-controlled elements utilized for the formations, and other characteristics relating to the formations. As an example, a first formation set selected by the user may cause artificial-intelligence-controlled elements of a first combination of types (e.g., land-based combat units and medical units) to be to be utilized in formations during the secondary-game-mode session, while a second formation set selected by the user may cause artificial-intelligence-controlled elements of a second combination of types (e.g., land-based combat units, air-based combat units, medical units, and mechanical repair units) to be utilized in formations during the secondary-game-mode session.

Figure 3:
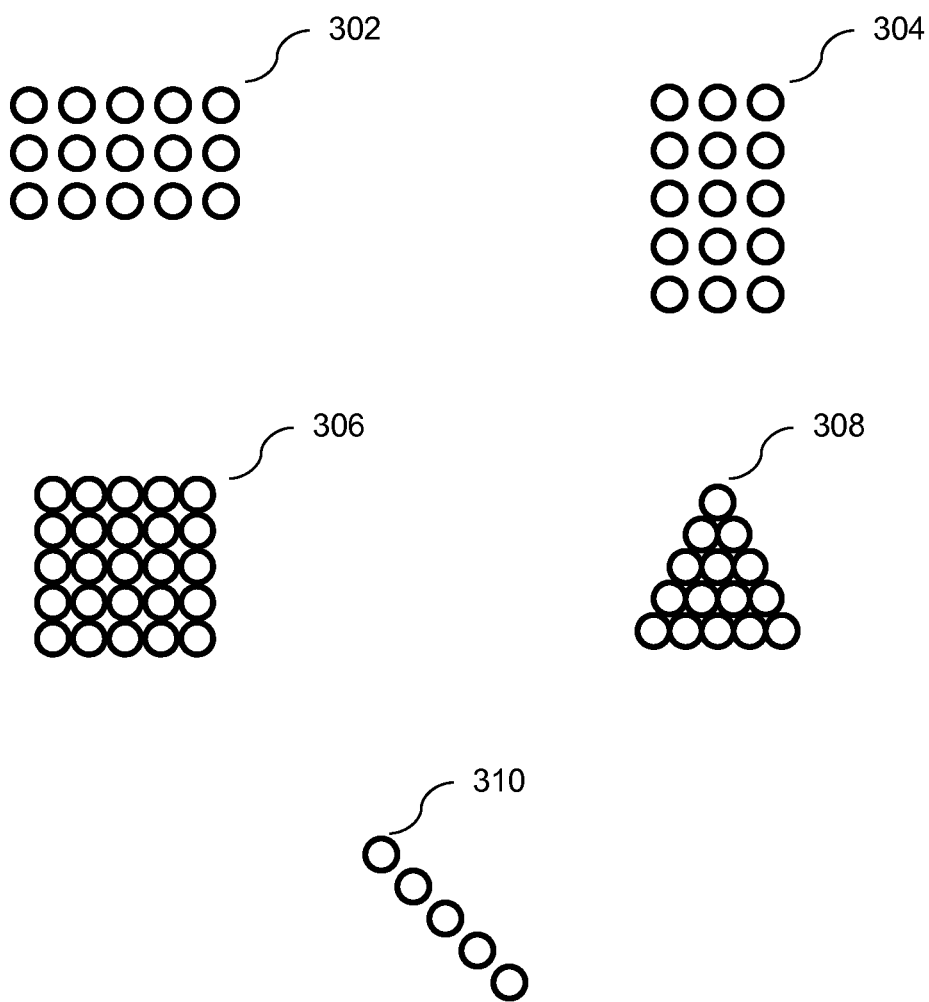
FIG. 3 illustrates a variety of formations relating to actions of elements, in accordance with one or more implementations.

As another example, with respect to FIGS. 2 and 3, a first formation set selected by the user may cause one or more of formations 302-310 or other formations to be utilized by artificial-intelligence-controlled opponents during the secondary-game-mode session, while a second formation set selected by the user may cause one or more other ones of formations 302-310 or other formations to be utilized by artificial-intelligence-controlled opponents during the secondary-game-mode session.

In one scenario, with respect to formations 302-310, line formation 302 may be a tactical formation that provides frontage for volley fire, while sacrificing maneuverability and defense against cavalry. Column formation 304 may be a tactical formation that provides rapid movement and maneuverability, but may limit the number of weapons that can be utilized at a time. Square formation 306 may be a tactical formation to arrange for tactical concentration of force. Wedge formation 308 may be a tactical formation to cut through and/or divide opposition forces. Echelon formation 310 may be a tactical formation that provides a group of character units in echelon formation 310 a greater range of vision and/or the ability to move opposition forces to the left or the right (e.g., depending on the direction of the echelon).

Secondary mode module 114 may be configured to execute a first session for the first user in the secondary game mode such that: (i) the first session involves the one or more first artificial-intelligence-controlled elements as opponents against the one or more first user-controlled elements; (ii) an arrangement of the one or more first user-controlled elements at a beginning of the first session is the same as an arrangement of the one or more first user-controlled elements in the primary game mode at a time of the session request; or (iii) one or more impacts on the one or more first user-controlled elements during the first session in the secondary game mode are not reflected for the one or more first user-controlled elements in the primary game mode.

As used herein, an arrangement of user-controlled elements may refer to: one or more placements of the user-controlled elements relative to one another, relative to an area, or at absolute locations with respect to the game space; one or more capabilities of the user-controlled elements; one or more statuses of the user-controlled elements; one or more predetermined actions to be taken by the user-controlled elements; or other arrangement aspects relating to the user-controlled elements. By way of example, placement of the user-controlled elements relative to one another may include placement of the user-controlled elements in one or more of the formations 302-310 of FIG. 3 or other formations for attack, defense, or other purposes. Placement of the user-controlled elements relative to an area may include placement of the user-controlled elements within predetermined distances from the center of the area or the boundaries of the area to ready the user-controlled elements to attack the area, defend the area, etc. By way of another example, capabilities of the user-controlled elements may include combat capabilities, repair capabilities, medical capabilities, storage capabilities, construction capabilities, training capabilities, or other capabilities. Statuses of the user-controlled elements may include hit point statuses, attack power statuses, defense strength statuses, travel speed statuses, or other statuses. Predetermined actions to be taken by the user-controlled elements may include actions to be taken responsive to an occurrence of one or more conditions, actions by the user-controlled elements that are currently in-progress, or other actions.

In one use case, a hit point status of a user-controlled element that is controlled by, positioned by, or associated with a first user may be 500/500 hit points in the primary game mode when the user initiates a session request for a session in the secondary game mode. As such, when the secondary-game-mode session begins, the hit point status of the user-controlled element may be 500/500 hit points for the secondary-game-mode session. Other arrangement aspects of the user-controlled element at the beginning of the secondary-game-mode session may be the same as the other arrangement aspects of the user-controlled element at the time of the session request.

In another use case, damage or other modification to the user-controlled elements caused during the secondary-game-mode session may be reflected in the secondary game mode, but not reflected for the user-controlled elements in the primary game mode. For example, the user-controlled elements may be killed, destroyed, or otherwise rendered unusable to the user during the secondary-game-mode session as a result of actions by artificial-intelligence-controlled opponents in the secondary-game-mode session. However, once the secondary-game-mode session ends, and the user is returned to the primary game mode, the user-controlled element may be alive, intact, and otherwise usable by the user in the primary game mode. The user-controlled element may, for instance, have the same arrangement after the user is returned to the primary game mode as the arrangement of the user-controlled element at the time of the session request or at the beginning of the secondary-game-mode session.

In various implementations, the one or more impacts may include a modification to one or more hit point statuses of the one or more first user-controlled elements. The modification to the one or more hit point statuses may, for instance, relate to one or more actions of the one or more first user-controlled elements or the one or more first artificial-intelligence-controlled elements during the first session. In some implementations, the modification may include an increase to at least one of the one or more hit point statuses of at least one of the one or more first user-controlled elements, or a decrease to at least another one of the one or more hit point statuses of at least another one of the one or more first user-controlled elements. For example, in one scenario, a user-controlled element may attack an artificial-intelligence-controlled opponent during the first session by absorbing the hit points of the artificial-intelligence-controlled opponent, resulting in an increase in the hit point status of the user-controlled element performing the absorption. In another scenario, a user-controlled element may be attacked by an artificial-intelligence-controlled element, resulting in a decrease in the hit point status of the user-controlled element.

In certain implementations, secondary mode module 114 may be configured such that the modification is reflected for the one or more first user-controlled elements in the secondary game mode while not reflected for the one or more first user-controlled elements in the primary game mode. For example, at least some of the one or more first user-controlled elements may suffer a decrease in their hit point statuses during the secondary-game-mode session as a result of actions by artificial-intelligence-controlled opponents in the secondary-game-mode session. However, once the secondary-game-mode session ends, and the first user is returned to the primary game mode, it may appear that the first user-controlled elements never suffered the hit point status decrease that occurred in the secondary-game-mode-session. The first user-controlled elements may, for instance, have the same hit point statuses after the user is returned to the primary game mode as the arrangement of the first user-controlled elements at the time of the session request or at the beginning of the secondary-game-mode session.

In some implementations, the one or more impacts may include one or more modifications to one or more other statuses (e.g., attack power statuses, defense strength statuses, travel speed statuses, or other statuses) of the one or more first user-controlled elements. In one or more implementations, the one or more impacts may include one or more modifications to one or more other arrangement aspects of the one or more first user-controlled elements.

As indicated, in various implementations, the plurality of user-controlled elements may include structures, character units, items, or other elements controlled by, positioned by, or associated with the users. The one or more first user-controlled elements may include one or more of first structures, first character units, first items, or other elements controlled by, positioned by, or associated with the first user. In one or more implementations, the primary mode module or the secondary mode module may be configured such that one or more of the first structures, the first character units, or the first items defend the first area in the primary game mode and during the first session in the second game mode.

In one use case, the first structures, the first charter units, and the first items may defend the first area in the primary game mode against other user-controlled elements that are controlled by, positioned by, or associated with other users opposing the first user. When the first session in the secondary game mode begins, the first structures, the first character units, and the first items may then defend the first area in the secondary game mode against artificial-intelligence-controlled elements that are selected as opponents for the first session. In another use case, attacks on the first area in the primary game mode by other user-controlled elements may be suspended while the first session is active. In yet another use case, the arrangement or the actions of the first structures, the first character units, and the first items during the first session in the secondary game mode may be seen by other users and/or their user-controlled elements that are in the primary game mode.

As indicated, in some implementations, the plurality of artificial-intelligence-controlled elements may include the one or more first artificial-intelligence-controlled elements associated with one or more first secondary-game-mode parameters, the one or more second artificial-intelligence-controlled elements associated with one or more second secondary-game-mode parameters, or other artificial-intelligence-controlled elements. In one or more implementations, secondary mode module 114 may be configured such that the one or more first secondary-game-mode parameters include a parameter relating to first difficulty level, and the one or more second secondary-game-mode parameters include a parameter relating to a second difficulty level that is different than the first difficult level. In one scenario, with respect to FIG. 2, a user may utilize user interface 200 to select a difficulty level for a secondary-game-mode session. Responsive to the selection of a difficulty level, a session request from the user may identify one or more parameters relating to the selected difficulty level. As such, a secondary-game-mode session executed for the user may correspond to the selected difficulty level.

In certain implementations, secondary mode module 114 may be configured to manage instruction sets relating to actions to be performed by one or more of the plurality of artificial-intelligence-controlled elements during a session in the secondary game mode. The instruction sets may include a first instruction set that is associated with the one or more first secondary-game-mode parameters and that relates to first actions to be performed by one or more of the plurality of artificial-intelligence-controlled elements during a session in the secondary game mode.

In some implementations, the execution of the first session by secondary mode module 114 may comprise execution of the first instruction set to cause the one or more first artificial-intelligence-controlled elements to perform the first actions during the first session. Secondary mode module 114 may, for instance, execute the first instruction set to cause the one or more first artificial-intelligence-controlled elements to perform the first actions during the first session based on the determination that the one or more secondary-game-mode parameters (identified by information in the session request) correspond to the one or more first secondary-game-mode parameters (to which the first instruction set is associated). In one scenario, for instance, the one or more secondary-game-mode parameters and the one or more first secondary game-game-mode parameters may relate to the same difficulty level, the same types of artificial-intelligence-controlled elements to be utilized as opponents for a secondary-game-mode session, or the same formations of the artificial-intelligence-controlled elements that relate to attack, defense, or other actions of the artificial-controlled elements.

In one or more implementations, secondary mode module 114 may be configured such that the first actions performed by the one or more first artificial-intelligence-controlled elements during the first session include one or more of: (i) attacking the one or more first user-controlled elements in accordance with one or more first formations of the one or more first artificial-intelligence-controlled elements; or (ii) defending against the one or more first user-controlled elements in accordance with one or more second formations of the one or more first artificial-intelligence-controlled elements.

In various implementations, secondary mode module 114 may be configured to receive another session request from the first user for a session in the secondary game mode that is to occur after the first session. The other session request may include information identifying one or more other secondary-game-mode parameters for a session in the secondary game mode. Secondary mode module 114 may be configured to select the one or more second artificial-intelligence-controlled elements as opponents against the one or more first user-controlled elements for a second session for the first user in the secondary game mode. The selection may, for instance, be based on a determination that the one or more other secondary-game-mode parameters (identified by information in the other session request) correspond to the one or more second secondary-game-mode parameters (to which the one or more second artificial-intelligence-controlled elements are associated).

In some implementations, secondary mode module 114 may be configured to execute the second session such that:

(i) the second session involves the one or more second artificial-intelligence-controlled elements as opponents against the one or more first user-controlled elements; (ii) an arrangement of the one or more first user-controlled elements at a beginning of the second session is an arrangement of the one or more first user-controlled elements at a time of the other session request; or (iii) one or more other impacts on the one or more first user-controlled elements during the second session in the secondary game mode are not reflected for the one or more first user-controlled elements in the primary game mode.

In certain implementations, secondary mode module 114 may be configured such that the instruction sets include a second instruction set that is associated with the one or more second secondary-game-mode parameters and that relates to second actions to be performed by one or more of the plurality of artificial-intelligence-controlled elements during a session in the secondary game mode. In one or more implementations, the execution of the second session by secondary mode module 114 may comprise execution of the second set of instructions to cause the one or more second artificial-intelligence-controlled elements to perform the second actions during the second session. Secondary mode module 114 may, for instance, execute the second set of instructions to cause the one or more second artificial-intelligence-controlled elements to perform the second actions during the second session based on the determination that the one or more other secondary-game-mode parameters correspond to the one or more second secondary-game-mode parameters.

In some implementations, the second actions performed by the one or more second artificial-intelligence-controlled elements during the second session may include one or more of: (i) attacking the one or more first user-controlled elements in accordance with one or more third formations of the one or more second artificial-intelligence-controlled elements; or (ii) defending against the one or more first user-controlled elements in accordance with one or more fourth formations of the one or more second artificial-intelligence-controlled elements.

As indicated, in various implementations, the first actions performed by the one or more first artificial-intelligence-controlled elements during the first session may include attacking-related actions, defending-related actions, other actions in accordance with one or more of the first formations or the second formations. In one or more implementations, the one or more third formations may be different than the one or more first formations. The one or more fourth formations may be different than the one or more second formations.

Server(s) 102, client computing platforms 104, external resources 116, and/or other components may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platforms 104, external resources 116, and/or other components may be operatively linked via some other communication media.

A given client computing platform 104 may include one or more processors configured to execute computer program modules. The computer program modules may be configured to enable an expert or user associated with client computing platform 104 to interface with system 100 and/or external resources 116, and/or provide other functionality attributed herein to client computing platforms 104. By way of non-limiting example, client computing platform 104 may include one or more of a desktop computer, a laptop computer, a handheld computer, a netbook, a smartphone, a gaming console, and/or other computing platforms.

External resources 116 may include sources of information, hosts and/or providers of virtual spaces outside of system 100, external entities participating with system 100, and/or other resources. In some implementations, some or all of the functionality attributed herein to external resources 116 may be provided by resources included in system 100.

In some implementations, server(s) 102 may include an electronic storage 118, one or more processor(s) 120, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may comprise non-transitory storage media that electronically stores information. The electronic storage media of electronic storage 118 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor(s) 120, information received from server(s) 102, information received from client computing platforms 104, and/or other information that enables server(s) 102 to function as described herein.

Processor(s) 120 is configured to provide information processing capabilities in server(s) 102. As such, processor(s) 120 may include one or more of a digital processor, an analog processor, a digital circuit designed to process information, an analog circuit designed to process information, a state machine, and/or other mechanisms for electronically processing information. Although processor(s) 120 is shown in FIG. 1 as a single entity, this is for illustrative purposes only. In some implementations, processor(s) 120 may include a plurality of processing units. These processing units may be physically located within the same device, or processor(s) 120 may represent processing functionality of a plurality of devices operating in coordination. Processor(s) 120 may be configured to execute modules 106, 108, 110, 112, 114, and/or other modules. Processor(s) 120 may be configured to execute modules 106, 108, 110, 112, 114, and/or other modules by software; hardware; firmware; some combination of software, hardware, and/or firmware; and/or other mechanisms for configuring processing capabilities on processor(s) 120. As noted, in certain implementations, a given client computing platform 104 may include one or more computer program modules that is the same as or similar to the computer program modules of server(s)

102. Client computing platform 104 may include one or more processors that are the same or similar to processor(s) 120 of server(s) 102 to execute such computer program modules of client computing platform 104.

It should be appreciated that although modules 106, 108, 110, 112, and 114 are illustrated in FIG. 1 as being co-located within a single processing unit, in implementations in which processor(s) 120 includes multiple processing units, one or more of modules 106, 108, 110, 112, and/or 114 may be located remotely from the other modules. The description of the functionality provided by the different modules 106, 108, 110, 112, and/or 114 described below is for illustrative purposes, and is not intended to be limiting, as any of modules 106, 108, 110, 112, and/or 114 may provide more or less functionality than is described. For example, one or more of modules 106, 108, 110, 112, and/or 114 may be eliminated, and some or all of its functionality may be provided by other ones of modules 106, 108, 110, 112, and/or 114. As another example, processor(s) 120 may be configured to execute one or more additional modules that may perform some or all of the functionality attributed below to one of modules 106, 108, 110, 112, and/or 114.

Figure 4:
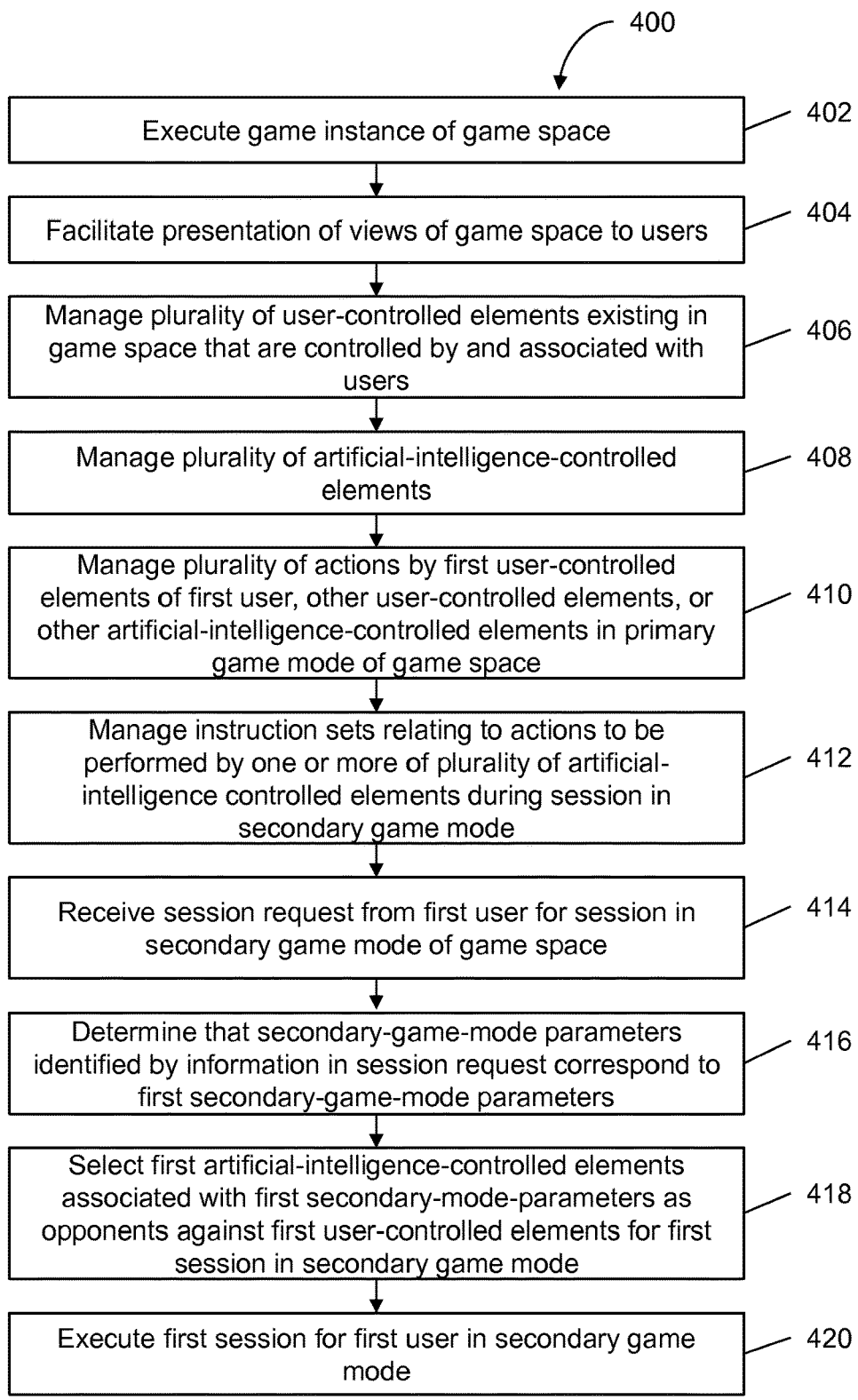
FIG. 4 illustrates a method of facilitating secondary-game-mode sessions based on primary-game-mode arrangements of user-controlled elements, in accordance with one or more implementations.

FIG. 4 illustrates a method of facilitating secondary-game-mode sessions based on primary-game-mode arrangements of user-controlled elements, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, a game instance of a game space may be executed. Operation 402 may be performed by a game module that is the same as or similar to game module 106, in accordance with one or more implementations.

At an operation 404, presentation of views of the game space to users may be facilitated. The game space may be configured to facilitate interaction of the users with the game space and/or each other by performing operations in the game space in response to commands received from the users. Operation 404 may be performed by a game module that is the same as or similar to game module 106, in accordance with one or more implementations.

At an operation 406, a plurality of user-controlled elements existing in the game space that are controlled by, positioned by, or associated with the users may be managed. The users may include a first user. The plurality of user-controlled elements may include one or more first user-controlled elements existing in the game space that are controlled by, positioned by, or associated with the first user. In certain implementations, the plurality of user-controlled elements may include structures, character units, or items controlled by, positioned by, or associated with the users. In some implementations, the structures, the character units, or the items may include first structures, first character units, or first items controlled by, positioned by, or associated with the first user. The one or more first user-controlled elements may include one or more of the first structures, the first character units, or the first items. Operation 406 may be performed by a user element module that is the same as or similar to user element module 108, in accordance with one or more implementations.

In various implementations, the game space may include a plurality of areas. The plurality of areas may, for instance, include a first area associated with the first user. The one or more first user-controlled elements (e.g., the first structures, the first character units, the first items, or other first user-controlled elements) may, for instance, come into existence with respect to the game space in the first area. In some implementations, the one or more first user controlled elements (e.g., the first structures, the first character units, the first items, or other first user-controlled elements) may defend the first area in the primary game mode and during the first session in the second game mode.

At an operation 408, a plurality of artificial-intelligence-controlled elements may be managed. The plurality of artificial-intelligence-controlled elements may include one or more first artificial-intelligence-controlled elements associated with one or more first secondary-game-mode parameters. Operation 408 may be performed by an artificial-intelligence element module that is the same as or similar to artificial-intelligence element module 110, in accordance with one or more implementations.

At an operation 410, a plurality of actions by the one or more first user-controlled elements, one or more other user-controlled elements, or one or more other artificial-intelligence-controlled elements in a primary game mode of the game space may be managed. For example, the plurality of actions may include attacks by the one or more first user-controlled elements on the one or more other user-controlled elements or attacks by the one or more other user-controlled elements on the one or more first user-controlled elements. Operation 410 may be performed by a primary mode module that is the same as or similar to primary mode module 112, in accordance with one or more implementations.

At an operation 412, instruction sets relating to actions to be performed by one or more of the plurality of artificial-intelligence-controlled elements during a session in the secondary game mode may be managed. The instruction sets may, for instance, include a first instruction set that is associated with the one or more first secondary-game-mode parameters (to which the one or more first artificial-intelligence-controlled elements are associated) and that relates to first actions to be performed by one or more of the plurality of artificial-intelligence-controlled elements during a session in the secondary game mode. Operation 412 may be performed by a secondary mode module that is the same as or similar to secondary mode module 114, in accordance with one or more implementations.

At an operation 414, a session request for a session in a secondary game mode of the game space may be received from the first user. The session request may, for instance, include information identifying one or more secondary-game-mode parameters for a session in the secondary game mode. Operation 414 may be performed by a secondary mode module that is the same as or similar to secondary mode module 114, in accordance with one or more implementations.

At an operation 416, the one or more secondary-game-mode parameters identified by information in the session request may be determined to correspond to the one or more first secondary-game-mode parameters (to which the one or more first artificial-intelligence-controlled elements are associated). Operation 416 may be performed by a secondary mode module that is the same as or similar to secondary mode module 114, in accordance with one or more implementations.

At an operation 418, the one or more first artificial-intelligence-controlled elements (associated with the one or more first secondary-game-mode parameters) may be selected as opponents against the one or more first user-controlled elements for a first session in the secondary game mode. The selection may, for instance, be based on the determination that the one or more secondary-game-mode parameters (identified by information in the session request) correspond to the one or more first secondary-game-mode parameters. Operation 418 may be performed by a secondary mode module that is the same as or similar to secondary mode module 114, in accordance with one or more implementations.

At an operation 420, the first session may be executed in the secondary game mode for the first user. The first session may, for instance, be executed such that: (i) the first session involves the one or more first artificial-intelligence-controlled elements as opponents against the one or more first user-controlled elements; (ii) an arrangement of the one or more first user-controlled elements at a beginning of the first session is the same as an arrangement of the one or more first user-controlled elements in the primary game mode at a time of the session request; or (iii) one or more impacts on the one or more first user-controlled elements during the first session in the secondary game mode are not reflected for the one or more first user-controlled elements in the primary game mode. Operation 420 may be performed by a secondary mode module that is the same as or similar to secondary mode module 114, in accordance with one or more implementations.

In certain implementations, with respect to operation 420, the one or more impacts may include a modification to one or more hit point statuses of the one or more first user-controlled elements. For example, the modification may include an increase to at least one of the one or more hit point statuses of at least one of the one or more first user-controlled elements, or a decrease to at least another one of the one or more hit point statuses of at least another one of the one or more first user-controlled elements. The modification may, for instance, relate to one or more actions of the one or more first user-controlled elements or the one or more first artificial-intelligence-controlled elements during the first session. In some implementations, the modification may be reflected for the one or more first user-controlled elements in the secondary game mode while not reflected for the one or more first user-controlled elements in the primary game mode.

As indicated, in certain implementations, a first instruction set may be associated with the one or more first secondary-game-mode parameters and relate to first actions to be performed by one or more of the plurality of artificial-intelligence-controlled elements during a session in the secondary game mode.

In various implementations, with respect to operation 420, executing the first session may comprise executing the first instruction set to cause the one or more first artificial-intelligence-controlled elements to perform the first actions during the first session. The execution of the first instruction set (associated with the one or more first secondary-game-mode parameters) may, for instance, be based on the determination that the one or more secondary-game-mode parameters (identified by information in the session request) correspond to the one or more first secondary-game-mode parameters.

In some implementations, with respect to operation 420, the first actions performed by the one or more first artificial-intelligence-controlled elements during the first session include one or more of: (i) attacking the one or more first user-controlled elements in accordance with one or more first formations of the one or more first artificial-intelligence-controlled elements; or (ii) defending against the one or more first user-controlled elements in accordance with one or more second formations of the one or more first artificial-intelligence-controlled elements.

Figure 5:
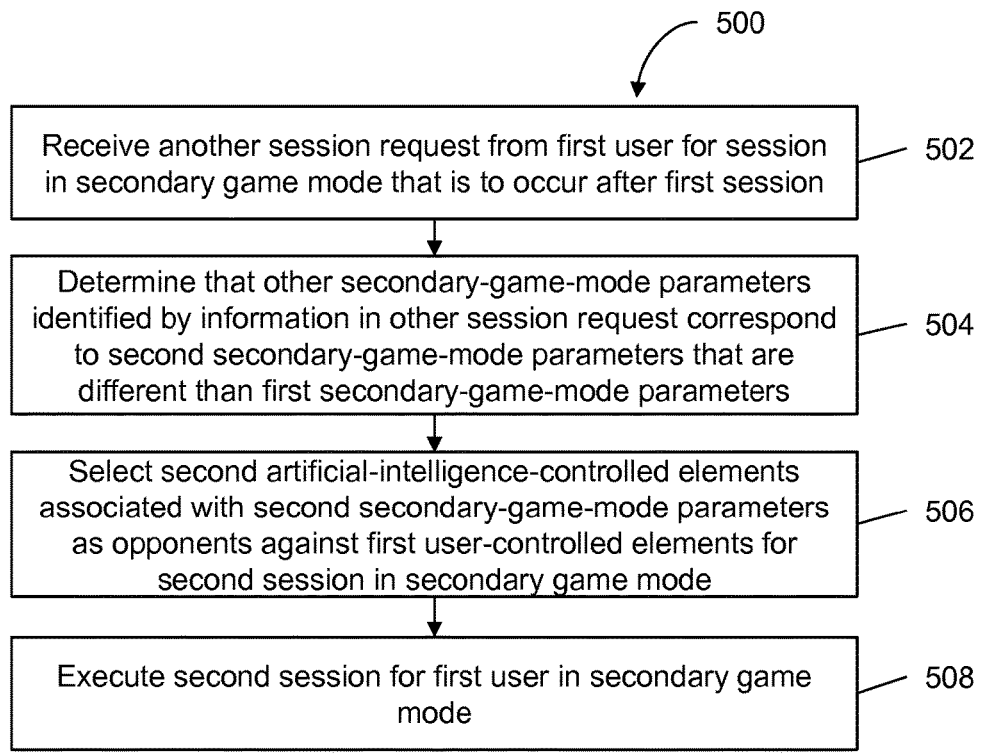
FIG. 5 illustrates a method of facilitating different secondary-game-mode sessions based on different second-game-mode parameters, in accordance with one or more implementations.

FIG. 5 illustrates a method of facilitating different secondary-game-mode sessions based on different second-game-mode parameters. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

In certain implementations, a plurality of artificial-intelligence-controlled elements (e.g., that are managed by an artificial-intelligence element module that is the same as or similar to artificial-intelligence element module 110) may include one or more first artificial-intelligence-controlled elements associated with one or more first secondary-game-mode parameters, one or more second artificial-intelligence-controlled elements associated with one or more second secondary-game-mode parameters, or other artificial-intelligence-controlled elements.

In some implementations, one or more of operations 402-420 may be performed. For example, a session request for a session in the secondary game mode may be received from a first user, and a first session may be executed in the secondary game mode for the first user based on the session request. The first session may, for instance, be executed such that: (i) the first session involves the one or more first artificial-intelligence-controlled elements as opponents against one or more first user-controlled elements that are controlled by, positioned by, or associated with the first user; (ii) an arrangement of the one or more first user-controlled elements at a beginning of the first session is the same as an arrangement of the one or more first user-controlled elements in the primary game mode at a time of the session request; or (iii) one or more impacts on the one or more first user-controlled elements during the first session in the secondary game mode are not reflected for the one or more first user-controlled elements in the primary game mode.

At an operation 502, another session request for a session in the secondary game mode that is to occur after the first session may be received from the first user. The other session request may, for instance, include information identifying one or more other secondary-game-mode parameters for a session in the secondary game mode that is to occur after the first session. Operation 502 may be performed by a secondary mode module that is the same as or similar to secondary mode module 114, in accordance with one or more implementations.

At an operation 504, the one or more other secondary-game-mode parameters identified by information in the other session request may be determine to correspond to the one or more second secondary-game-mode parameters (that are different than the one or more first secondary-game-mode parameters). Operation 504 may be performed by a secondary mode module that is the same as or similar to secondary mode module 114, in accordance with one or more implementations.

At an operation 506, the one or more second artificial-intelligence-controlled elements (associated with the one or more second secondary-game-mode parameters) may be selected as opponents against the one or more user-controlled elements for a second session in the secondary game mode. The selection of the one or more second artificial-intelligence-controlled elements may be based on the determination that the one or more other secondary-game-mode parameters (identified by information in the other session request) correspond to the one or more second secondary-game-mode parameters. Operation 506 may be performed by a secondary mode module that is the same as or similar to secondary mode module 114, in accordance with one or more implementations.

At an operation 508, the second session may be executed in the secondary game mode for the first user. The second session may, for instance, be executed such that: (i) the second session involves the one or more second artificial-intelligence-controlled elements as opponents against the one or more first user-controlled elements; (ii) an arrangement of the one or more first user-controlled elements at a beginning of the second session is an arrangement of the one or more first user-controlled elements at a time of the other session request; or (iii) one or more other impacts on the one or more first user-controlled elements during the second session in the secondary game mode are not reflected for the one or more first user-controlled elements in the primary game mode. Operation 508 may be performed by a secondary mode module that is the same as or similar to secondary mode module 114, in accordance with one or more implementations.

As indicated, in certain implementations, instruction sets relating to actions to be performed by one or more of the plurality of artificial-intelligence-controlled elements during a session in the secondary game mode may be managed. The instruction sets may include: (i) a first instruction set that is associated with the one or more first secondary-game-mode parameters and that relates to first actions to be performed by one or more of the plurality of artificial-intelligence-controlled elements during a session in the secondary game mode; and (ii) a second instruction set that is associated with the one or more second secondary-game-mode parameters and that relates to second actions to be performed by one or more of the plurality of artificial-intelligence-controlled elements during a session in the secondary game mode.

In various implementations, with respect to operation 508, executing the second session may comprise executing the second set of instructions to cause the one or more second artificial-intelligence-controlled elements to perform the second actions during the second session. The execution of the second instruction set (associated with the one or more second secondary-game-mode parameters) may, for instance, be based on the determination that the one or more other secondary-game-mode parameters (identified by information in the other session request) correspond to the one or more second secondary-game-mode parameters.

In some implementations, with respect to operation 508, the second actions performed by the one or more first artificial-intelligence-controlled elements during the first session include one or more of: (i) attacking the one or more first user-controlled elements in accordance with one or more third formations of the one or more first artificial-intelligence-controlled elements; or (ii) defending against the one or more first user-controlled elements in accordance with one or more fourth formations of the one or more first artificial-intelligence-controlled elements. The one or more third formations may be different than the one or more first formations (with which the first actions are performed during the first session). The one or more fourth formations may be different than the one or more second formations (with which the first actions are performed during the first session).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for facilitating secondary-game-mode sessions based on primary-game-mode arrangements of user-controlled elements, the system comprising:

one or more physical processors configured by machine-readable instructions to:

execute an instance of a game space, and to facilitate transmission of state information regarding the game space to client computing platforms that causes presentation of views of the game space to users on the client computing platforms, wherein the game space is configured to facilitate interaction of the users with the game space and/or each other by performing operations in the game space in response to commands received from the users, and to determine the state information for transmission to reflect performance of such operations;

manage a plurality of user-controlled elements existing within realms associated with the users in the game space that are controlled by, positioned by, or associated with the users, wherein the users include a first user, and wherein the plurality of user-controlled elements include one or more first user-controlled elements existing within a realm associated with the first user in the game space that are controlled by, positioned by, or associated with the first user;

manage a plurality of actions by the one or more first user-controlled elements, one or more opponent elements, and/or one or more other elements in a primary game mode of the game space, wherein the plurality of actions include attacks by the one or more first user-controlled elements on the one or more other user-controlled elements within one or more realms associated with one or more other users or attacks by the one or more other user-controlled elements on the one or more first user-controlled elements within the realm associated with the first user, wherein impacts of the attacks to the one or more first user-controlled elements within the realm associated with the first user and the other user-controlled elements within the one or more realms associated with the one or more other users are persistent within the primary game mode such that impacts of the attacks to the one or more first user-controlled elements and the one or more other user-controlled elements are persistently reflected in the instance of the game space across multiple encounters between the one or more first user-controlled elements and the one or more other user-controlled elements; and receive a session request from the first user for a session in a secondary game mode of the game space, and to execute a first session for the first user in the secondary game mode such that: (i) the first session involves the one or more opponent elements against the one or more first user-controlled elements within the realm associated with the first user; (ii) an arrangement of the one or more first user-controlled elements within the realm associated with the first user at a beginning of the first session is the same as an arrangement of the one or more first user-controlled elements in the primary game mode at a time of the session request; and (iii) impacts on the one or more first user-controlled elements during the first session in the secondary game mode are not reflected for the one or more first user-controlled elements in the primary game mode.

2. The system of claim 1, wherein the plurality of user-controlled elements include structures, character units, or items controlled by, positioned by, or associated with the users.

3. The system of claim 1, wherein the game space includes a plurality of areas, wherein the plurality of areas include a first area associated with the first user, wherein the one or more first user-controlled elements include one or more of first structures, first character units, or first items controlled by, positioned by, or associated with the first user, and wherein the one or more processors are configured by machine-readable instructions such that the first structures, the first character units, or the first items come into existence with respect to the game space in the first area.

4. The system of claim 3, wherein the one or more processors are configured by machine-readable instructions such that one or more of the first structures, the first character units, or the first items defend the first area in the primary game mode and during the first session in the second game mode.

5. The system of claim 1, wherein the session request includes information identifying one or more secondary-game-mode parameters for a session in the secondary game mode, and wherein the one or more processors are configured by machine-readable instructions to select the one or more opponent elements for the one or more first user-controlled elements for the first session based on a determination that the one or more secondary-game-mode parameters correspond to the one or more first secondary-game-mode parameters.

6. The system of claim 1, wherein the one or more processors are is configured by machine-readable instructions such that managing the plurality of actions includes managing a plurality of opponent actions by the one or more opponent elements against the one or more first user-controlled elements within the realm associated with the first user, wherein the plurality of opponent actions during the first session include one or more of: (i) attacking the one or more first user-controlled elements in accordance with one or more first formations; or (ii) defending against the one or more first user-controlled elements in accordance with one or more second formations.

7. The system of claim 6, wherein the one or more processors are configured by machine-readable instructions to:
receive another session request from the first user for a session in the secondary game mode that is to occur after the first session, wherein the other session request includes information identifying one or more other secondary-game-mode parameters for a session in the secondary game mode;
execute the second session such that (i) an arrangement of the one or more first user-controlled elements at a beginning of the second session is an arrangement of the one or more first user-controlled elements at a time of the other session request; and (ii) one or more other impacts on the one or more first user-controlled elements during the second session in the secondary game mode are not reflected for the one or more first user-controlled elements in the primary game mode.

8. The system of claim 1, wherein second actions performed by the one or more opponent elements during the second session include one or more of: (i) attacking the one or more first user-controlled elements in accordance with one or more third formations of the one or more opponent elements; or (ii) defending against the one or more first user-controlled elements in accordance with one or more fourth formations of the one or more opponent elements, and wherein the one or more third formations are different than the one or more first formations or the one or more fourth formations are different than the one or more second formations.

9. The system of claim 1, wherein the one or more impacts include a modification to one or more hit point statuses of the one or more first user-controlled elements that relates to one or more actions of the one or more first user-controlled elements or the one or more opponent elements during the first session, and wherein the modification is reflected for the one or more first user-controlled elements in the secondary game mode while not reflected for the one or more first user-controlled elements in the primary game mode.

10. The system of claim 9, wherein the modification includes an increase to at least one of the one or more hit point statuses of at least one of the one or more first user-controlled elements, or a decrease to at least another one of the one or more hit point statuses of at least another one of the one or more first user-controlled elements.

11. A computer-implemented method of facilitating secondary-game-mode sessions based on primary-game-mode arrangements of user-controlled elements, the method being implemented on a computer system that includes one or more physical processors, the method comprising:
executing an instance of a game space;
facilitating transmission of state information regarding the game space to client computing platforms that causes presentation of views of the game space to users on the client computing platforms, wherein the game space is configured to facilitate interaction of the users with the game space and/or each other by performing operations in the game space in response to commands received from the users, and to determine the state information for transmission to reflect performance of such operations;

managing a plurality of user-controlled elements existing within realms associated with the users in the game space that are controlled by, positioned by, or associated with the users, wherein the users include a first user, and wherein the plurality of user-controlled elements include one or more first user-controlled elements existing within a realm associated with the first user in the game space that are controlled by, positioned by, or associated with the first user;

managing a plurality of actions by the one or more first user-controlled elements, one or more opponent elements, and/or one or more other elements in a primary game mode of the game space, wherein the plurality of actions include attacks by the one or more first user-controlled elements on the one or more other user-controlled elements within one or more realms associated with one or more other users or attacks by the one or more other user-controlled elements on the one or more first user-controlled elements within the realm associated with the first user, wherein impacts of the attacks to the one or more first user-controlled elements within the realm associated with the first user and the other user-controlled elements within the one or more realms associated with the one or more other users are persistent within the primary game mode such that impacts of the attacks to the one or more first user-controlled elements and the one or more other user-controlled elements are persistently reflected in the instance of the game space across multiple encounters between the one or more first user-controlled elements and the one or more other user-controlled elements; and receiving a session request from the first user for a session in a secondary game mode of the game space; and executing a first session for the first user in the secondary game mode such that: (i) the first session involves the one or more opponent elements against the one or more first user-controlled elements within the realm associated with the first user; (ii) an arrangement of the one or more first user-controlled elements within the realm associated with the first user at a beginning of the first session is the same as an arrangement of the one or more first user-controlled elements in the primary game mode at a time of the session request; and (iii) impacts on the one or more first user-controlled elements during the first session in the secondary game mode are not reflected for the one or more first user-controlled elements in the primary game mode.

12. The method of claim 11, wherein the plurality of user-controlled elements include structures, character units, or items controlled by, positioned by, or associated with the users.

13. The method of claim 11, wherein the game space includes a plurality of areas, wherein the plurality of areas include a first area associated with the first user, wherein the one or more first user-controlled elements include one or more of first structures, first character units, or first items controlled by, positioned by, or associated with the first user, and wherein the first structures, the first character units, or the first items come into existence with respect to the game space in the first area.

14. The method of claim 13, wherein one or more of the first structures, the first character units, or the first items defend the first area in the primary game mode and during the first session in the second game mode.

15. The method of claim 11, wherein the session request includes information identifying one or more secondary-game-mode parameters for a session in the secondary game mode, the method further comprising:

selecting the one or more opponent elements for the one or more first user-controlled elements for the first session based on a determination that the one or more secondary-game-mode parameters correspond to the one or more first secondary-game-mode parameters.

16. The method of claim 11, wherein managing the plurality of actions further comprises managing a plurality of opponent actions by the one or more opponent elements against the one or more first user-controlled elements within the realm associated with the first user, wherein the plurality of opponent actions during the first session include one or more of: (i) attacking the one or more first user-controlled elements in accordance with one or more first formations; or (ii) defending against the one or more first user-controlled elements in accordance with one or more second formations.

17. The method of claim 11, wherein the one or more impacts include a modification to one or more hit point statuses of the one or more first user-controlled elements that relates to one or more actions of the one or more first user-controlled elements or the one or more opponent elements during the first session, and wherein the modification is reflected for the one or more first user-controlled elements in the secondary game mode while not reflected for the one or more first user-controlled elements in the primary game mode.

18. The method of claim 17, wherein the modification includes an increase to at least one of the one or more hit point statuses of at least one of the one or more first user-controlled elements, or a decrease to at least another one of the one or more hit point statuses of at least another one of the one or more first user-controlled elements.

\* \* \* \* \*